(12) United States Patent
Lagies

(10) Patent No.: US 6,526,934 B1
(45) Date of Patent: Mar. 4, 2003

(54) DRIVE ARRANGEMENT FOR A VEHICLE

(75) Inventor: Dietmar Lagies, Wolfsburg (DE)

(73) Assignee: Volkswagen AG, Wolfsburg (DE)

( * ) Notice: Subject to any disclaimer, the term of this patent is extended or adjusted under 35 U.S.C. 154(b) by 0 days.

(21) Appl. No.: 09/786,479

(22) PCT Filed: Aug. 24, 1999

(86) PCT No.: PCT/EP99/06198

§ 371 (c)(1),
(2), (4) Date: Mar. 5, 2001

(87) PCT Pub. No.: WO00/14391

PCT Pub. Date: Mar. 16, 2000

(30) Foreign Application Priority Data

Sep. 5, 1998 (DE) .......................... 198 40 661

(51) Int. Cl.[7] .................................. F02F 7/00
(52) U.S. Cl. .................... 123/195 C; 180/292
(58) Field of Search ................. 123/195 C, 195 R; 180/292

(56) References Cited

U.S. PATENT DOCUMENTS

| | | |
|---|---|---|
| 4,446,828 A | 5/1984 | Bauder et al. |
| 5,014,812 A | 5/1991 | Kazama |
| 5,231,894 A | 8/1993 | Okita |
| 5,339,918 A | 8/1994 | Nakayama et al. |

FOREIGN PATENT DOCUMENTS

| | | |
|---|---|---|
| DE | 16 59 293 | 5/1953 |
| DE | 31 46 799 | 6/1983 |
| DE | 33 23 626 | 1/1985 |
| DE | 42 06 068 | 9/1992 |
| DE | 39 20 638 | 9/1995 |
| EP | 189 013 | 12/1985 |

OTHER PUBLICATIONS

Article 60 mot–SPEZIAL dated 1991.

*Primary Examiner*—Noah P. Kamen
(74) *Attorney, Agent, or Firm*—Cohen, Pontani, Lieberman & Pavane

(57) ABSTRACT

A drive arrangement for a vehicle including a drive assembly having a crankcase, and an oil sump arranged to close off the crankcase on one side. The oil sump and the crankcase have a common connecting plane. The oil sump has a first sidewall with an indent arranged to protrude into the oil sump, which indent is configured to receive a differential gear. The indent has an orifice for receiving an axle shaft projecting out of the differential gear. The orifice further has a center axis that runs through the connecting plane. The oil sump has a second wall with an orifice for an output shaft of the gear. A tunnel-like indentation is provided in the oil sump so as to connect the orifice to the indent for the differential gear. The tunnel-like indentation is configured so as to encase the output shaft relative to the oil sump.

7 Claims, 6 Drawing Sheets

DRIVE ARRANGEMENT FOR A VEHICLE

PRIORITY CLAIM

This is a U.S. national stage of application No. PCT/EP99/06198, filed on Aug. 24, 1999. Priority is claimed on that application and on the following application:

Country: Germany, Application No.: 198 40 661.4, Filed: Sep. 5, 1998.

BACKGROUND OF THE INVENTION

The invention relates to a drive arrangement for a vehicle, in particular for a motor vehicle, with a drive assembly comprising a crankcase which is closed off on one side by an oil sump, the oil sump and crankcase having a common connecting plane, and the oil sump having an indent protruding into the latter and belonging to a portion of a side wall, said indent being designed for receiving a differential gear, and also having an orifice for an axle shaft projecting out of the differential gear, according to the preamble of claim 1.

The journal mot-SPEZIAL, 1991, page 60, discloses a generic drive arrangement, an axle shaft of a right-hand driven front wheel running transversely through the oil sump and penetrating through a wall of the oil sump on a side opposite the differential gear. This arrangement is complicated, however, since appropriate fittings for sealing off the penetration point of the axle shaft have to be provided at this penetration point.

DE3920638 C2 discloses a drive system for a vehicle, in which the engine output power is transmitted via a clutch, a gear and a cardan shaft to the differential and from this via an intermediate shaft, a cardan joint, a driveshaft and a further cardan joint to a driving wheel located on the other side of the engine with respect to the differential. The output power is also transmitted from the differential via a cardan joint, a driveshaft and a further cardan joint to a driving wheel located on the same side of the engine with respect to the differential. In this case, the intermediate gear shaft runs through both side walls of the crankcase lower part. The intermediate gear shaft is therefore not mounted in the skirt of the cylinder box, so that said shaft can have a compact and simplified design, preferably essentially in the same way as with a cylinder block for an engine without a cylinder block tilt.

DE 4 2 06 068 A1 discloses an engine unit with an engine and a gear, a common oil sump being provided for the engine and the gear on the underside of the engine.

EP 0 189 013 A1 describes a drive arrangement for a tractor, a differential gear of a driven front axle, a clutch of an all-wheel drive and further elements of the front-axle drive being integrated into an oil sump.

The disadvantage of all the above-mentioned systems, however, is that at least one axle shaft extends from the differential gear completely through the oil sump and therefore a corresponding multiplicity of wall perforations have to be provided in the oil sump. The corresponding outlay necessary for sealing off these wall perforations in the oil sump leads to an increased outlay in terms of production and maintenance and to a correspondingly increased cost.

SUMMARY OF THE INVENTION

The object on which the present invention is based is, therefore, to provide an improved drive arrangement of the above-mentioned type, the above-mentioned disadvantages being overcome, while the form of construction is even more compact.

This object is achieved, according to the invention, by means of a drive arrangement of the above-mentioned type having the features characterized in claim 1. Advantageous refinements of the invention are specified in the dependent claims.

For this purpose, there is provision, according to the invention, for the oil sump to have an indent protruding into the latter and belonging to a portion of a side wall, said indent being designed for receiving a differential gear and having an orifice for an axle shaft projecting out of the differential gear, a center axis of the orifice running through the crankcase.

The advantage of this is that a compact form of construction is achieved, while at the same time a differential gear axle shaft extending through the orifice into the interior of the oil sump cannot be led out through a side wall of the oil sump, but through the crankcase.

An axle shaft guide closed off relative to the oil sump is achieved in that a guide means aligned with the orifice and surrounding the axle shaft projecting through the orifice is provided in the crankcase.

For a further increase in the construction density of elements of the drive arrangement, a further indentation of a wall portion of the oil sump into the latter is provided in a particularly advantageous way and is designed for at least partially receiving a secondary assembly, in particular an alternator.

In order to arrange the gear near the oil sump closely, compactly and so as to save construction space, an orifice for an output shaft of a gear is provided in the wall of the oil sump, a further indent of the wall of the oil sump being provided, said further indent connecting the orifice to the indent for the differential gear.

In order to receive completely the gear output shaft leading to the differential gear and for enclosing it relative to the interior of the oil sump, the indent connecting the orifice to the indent for the differential gear has a cylindrical design.

In a preferred embodiment, the oil sump has an essentially triangular design in cross section.

Expediently, the center axis of the orifice extends through a part of the crankcase which is designed as a bearing crossmember between the oil sump and the crankcase.

BRIEF DESCRIPTION OF THE DRAWINGS

Further features, advantages and advantageous refinements of the invention may be gathered from the dependent claims and from the following description of the invention with reference to the accompanying drawings, in which:

DETAILED DESCRIPTION OF THE PREFERRED EMBODIMENTS

Figure 1:
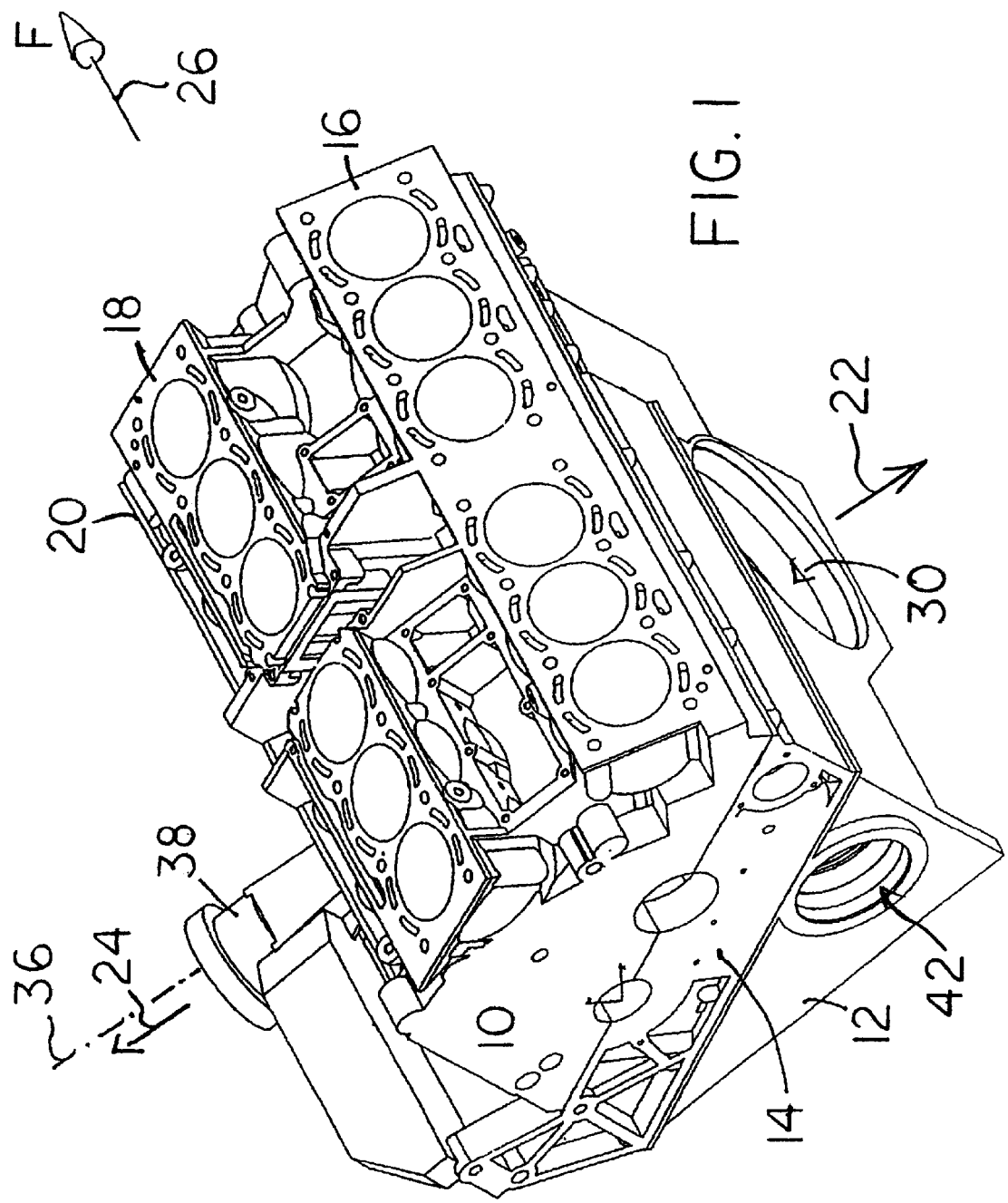
FIG. 1 shows a perspective view of a preferred embodiment of a drive arrangement according to the invention.
Figure 2:
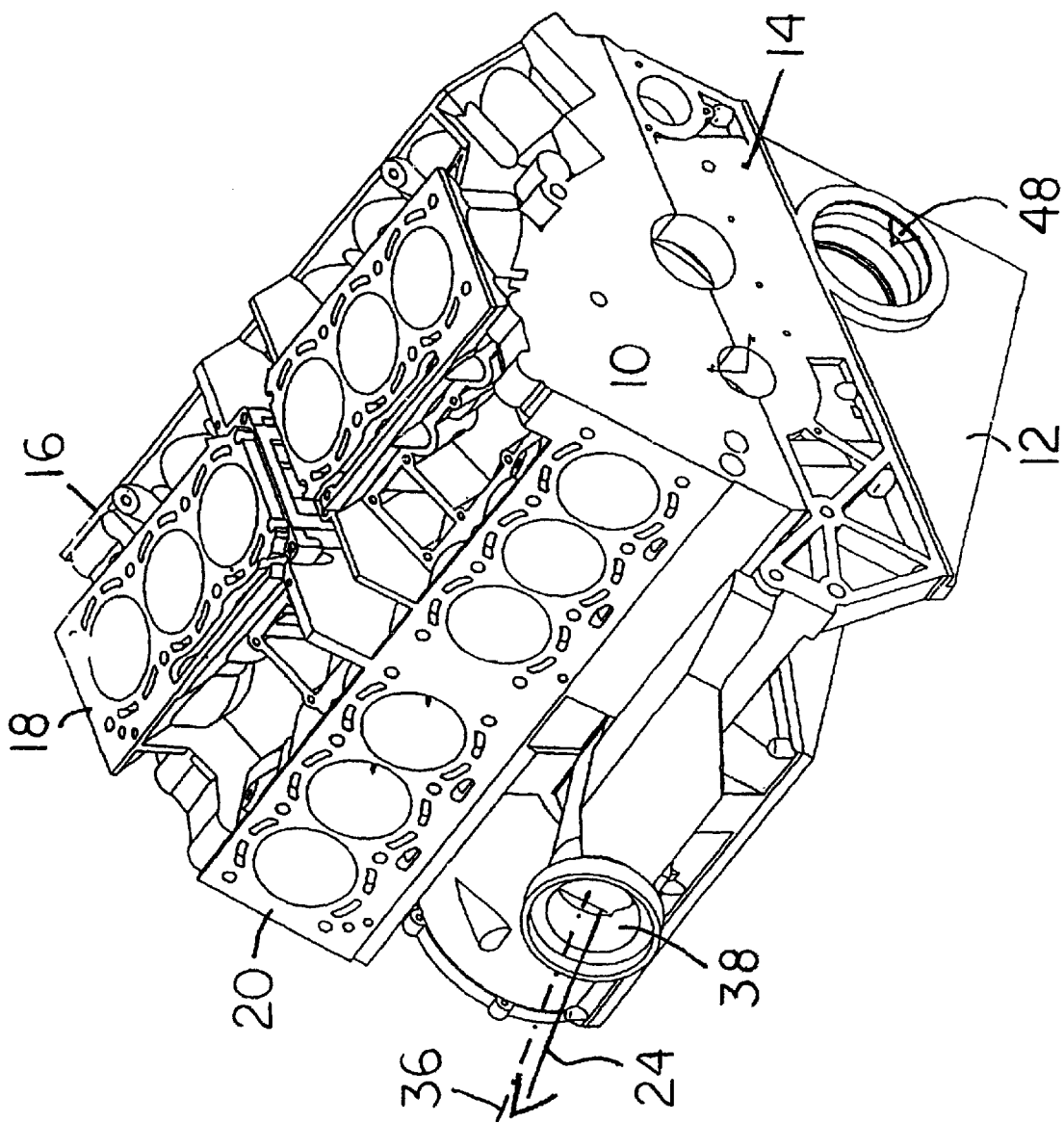
FIG. 2 shows a further perspective view of said embodiment.
Figure 3:
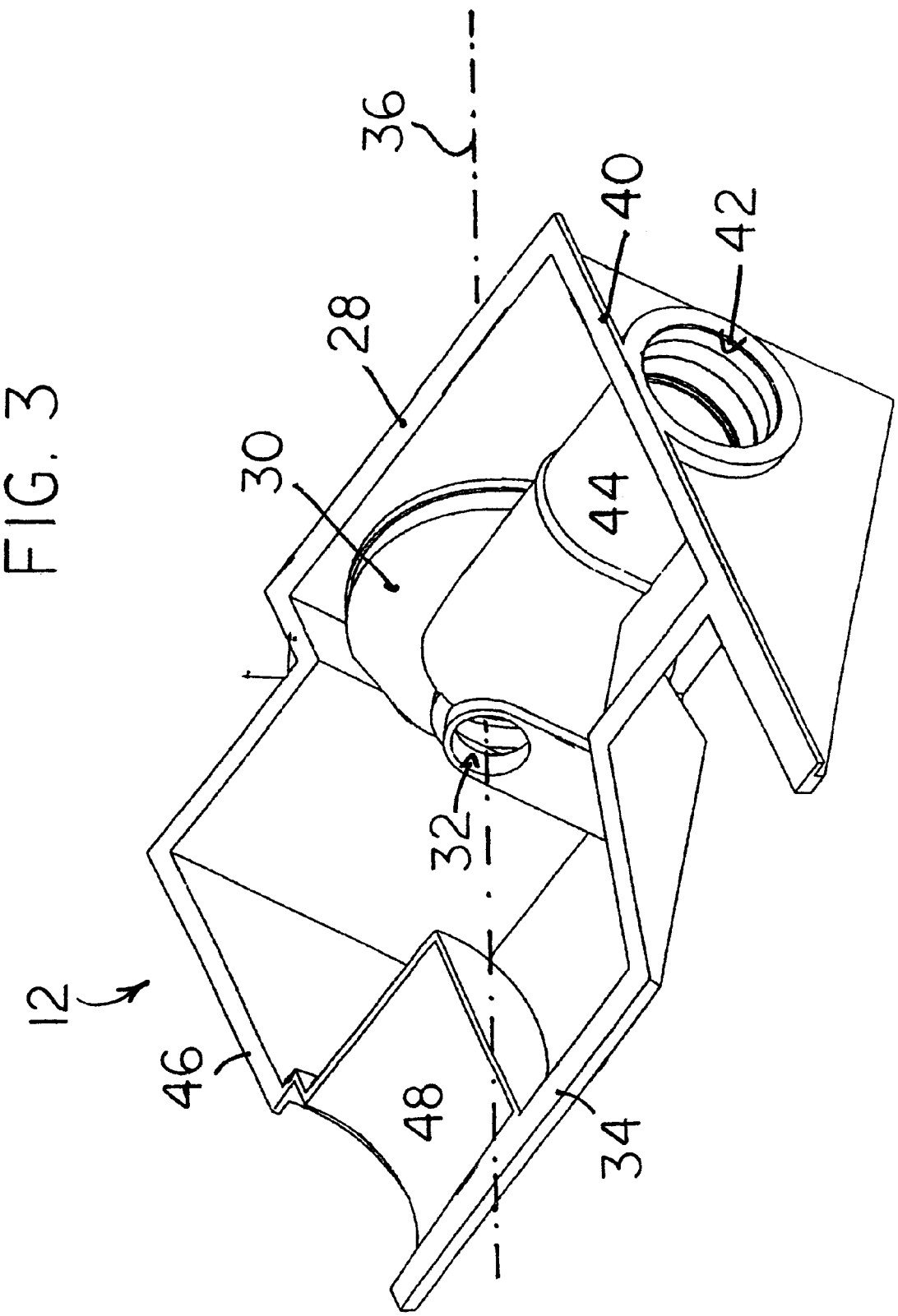
FIGS. 3 to 6 show various perspective views of an oil sump designed according to the invention.
Figure 4:
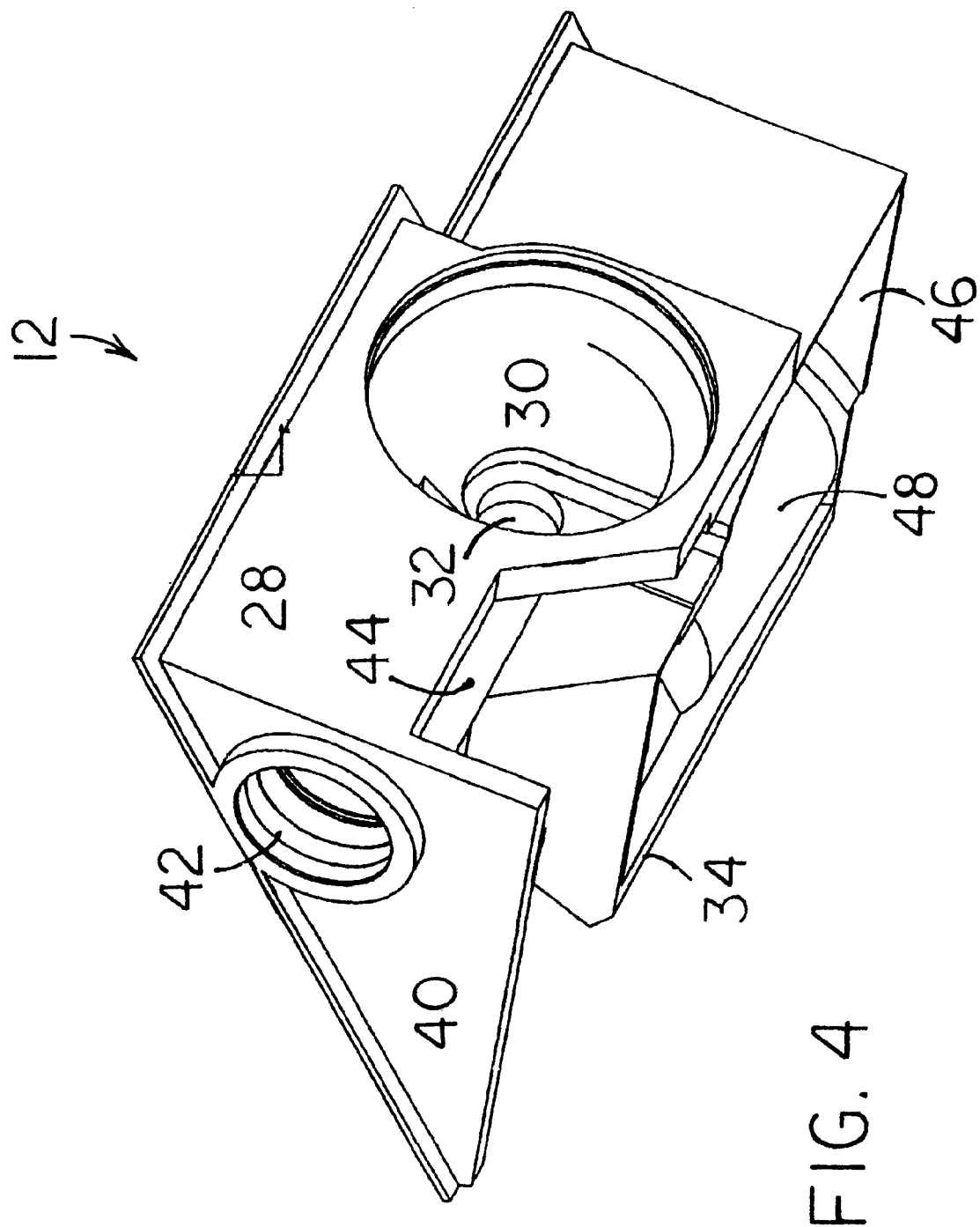
Figure 5:
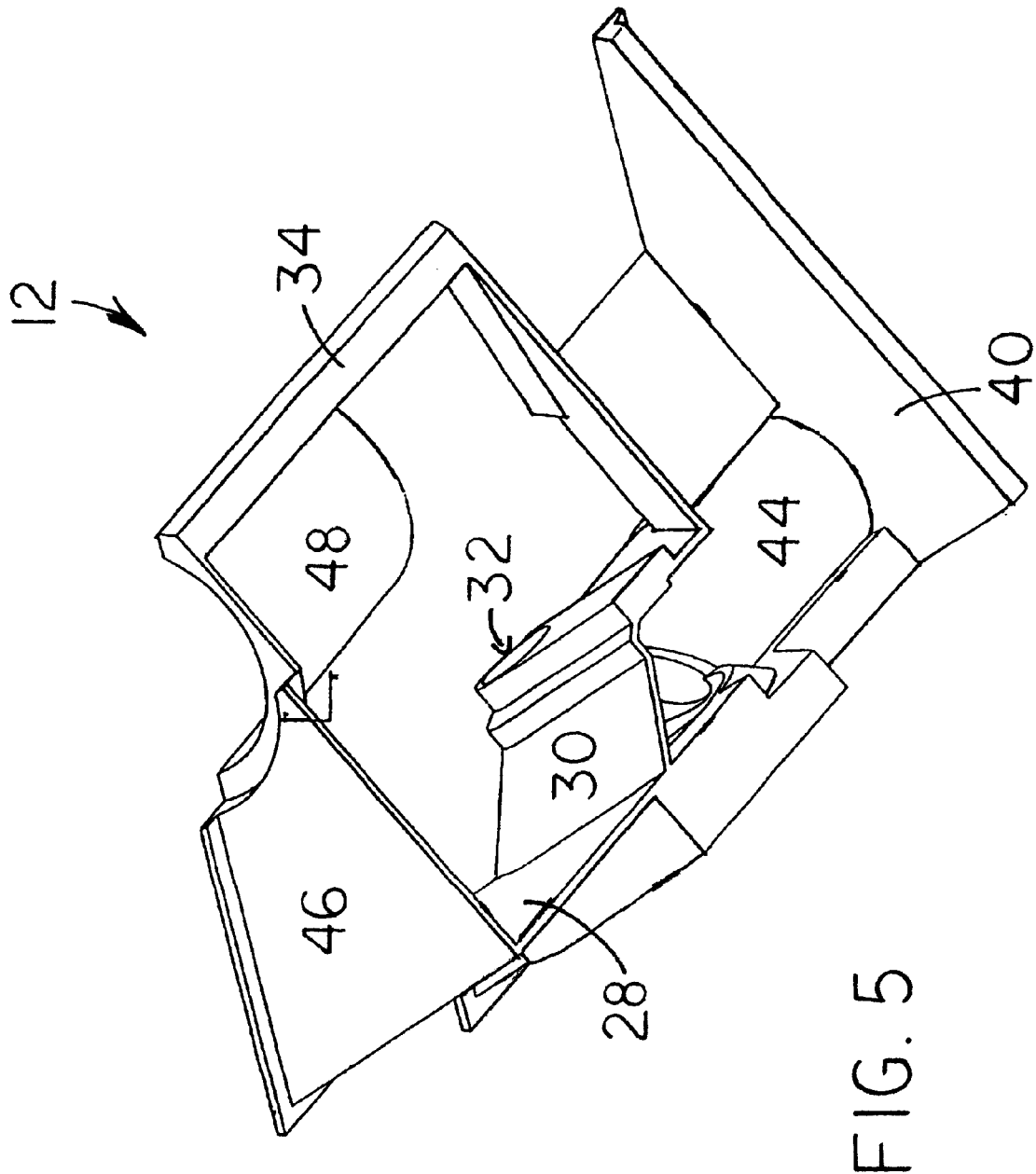
Figure 6:
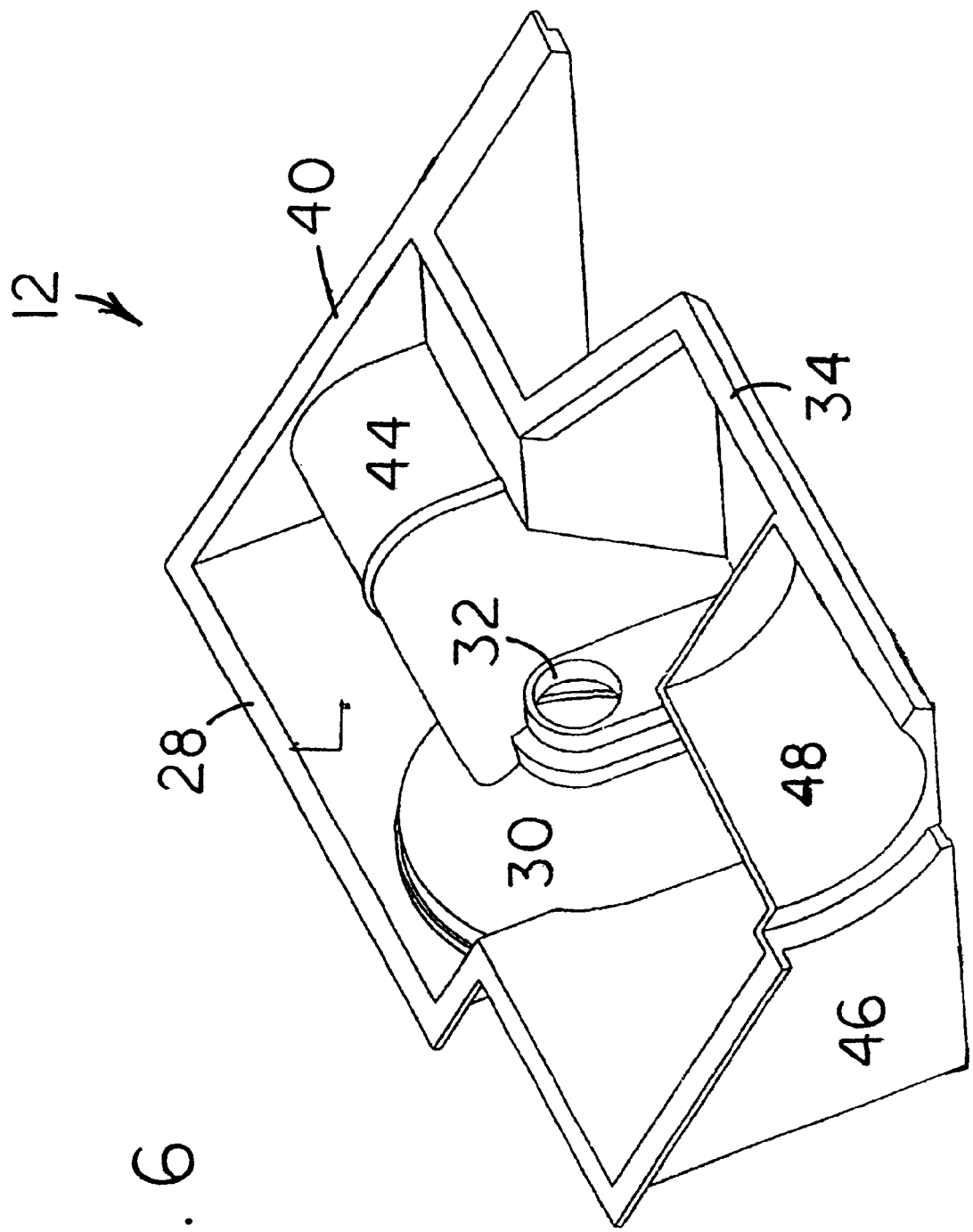

The preferred embodiment of a drive arrangement according to the invention, as illustrated in FIGS. 1 and 2, comprises a crankcase 10 and an oil sump 12, a lower part of the crankcase 10 being designed as a bearing crossmember 14 on the oil-sump side. In the embodiment illustrated by way of example, the crankcase 10 comprises three cylinder banks 16, 18 and 20, although a different number of cylinder banks or a different arrangement of the cylinders is possible.

A right-hand driven wheel, not illustrated, is located in the direction of the arrow 22 and a left-hand driven wheel, not illustrated, is located in the direction of the arrow 24, an arrow 26 in FIG. 1 designating a direction of travel.

The design according to the invention of the oil sump 12 can be seen in detail from FIGS. 3 to 6, the following statements relating to all of FIGS. 1 to 6.

An indentation or bay 30 is formed in a side wall 28 of the oil sump 12 in such a way that a differential gear, not illustrated, can be arranged in said indentation or bay. One of the axle shafts, not illustrated, projecting out of the differential gear extends through an orifice 32 in the bay 30 into an interior of the oil sump 12. The oil sump 12 is open on the crankcase side, this open side forming a common connecting plane with the crankcase. The orifice 3 in this case, is designed in such a way that a center axis 36 of the latter does not intersect an opposite wall 34 of the oil sump 12, but extends through the oil-sump/crankcase connecting plane. Provided around this center axis 36, on the crankcase side, is a guide which is in the form of a neck 38 (FIGS. 1 and 2) and is aligned with the orifice 32 and which provides a guide for the corresponding axle shaft. This axle shaft, which extends through the orifice 32, is therefore not led outward through the oil sump 12, but through the crankcase 10. In this case, the neck 38 is expediently designed in such a way that it extends into the oil sump 12 as far as the orifice 32 and so as to butt against the latter. This provides a corresponding encasing of the axle shaft relative to the oil sump 12.

Formed on a wall 40 of the oil sump 12 is an orifice 42 which is connected to the bay 30 via a tunnel-like indentation or bay 44 in the oil sump 12. An output shaft, not illustrated, of a gear, not illustrated, extends through this orifice 42 and the indentation 44 into the differential gear in the bay 30, the indentation 44 encasing the output shaft relative to the oil sump.

Provided on a side wall 46 of the oil sump 12 is a further indentation or bay 48 which is designed for at least partially receiving a secondary assembly, not illustrated, such as, for example, an alternator. A supply of cooling water to the secondary assembly arranged in the bay 48 is preferably provided via corresponding tap bores, not illustrated, leading, for example, to a cooling-water duct, not illustrated, of the third cylinder bank 20.

What is claimed is:

1. A drive arrangement for a vehicle, comprising: a drive assembly having a crankcase; and an oil sump arranged to close off the crankcase on one side, the oil sump and the crank case having a common connecting plane, the oil sump having a first sidewall with an indent arranged to protrude into the oil sump, said indent being configured so as to receive a differential gear, the indent having a first orifice for receiving an axle shaft projecting out of the differential gear, the orifice having a center axis that runs through the connecting plane, the oil sump having a second wall with a second orifice for an output shaft of a gear, a tunnel-like indentation being provided in the oil sump so as to connect the second orifice to the indent for the differential gear, the tunnel-like indentation being configured so as to encase the output shaft relative to the oil sump.

2. A drive arrangement as defined in claim 1, and further comprising guide means provided in the crankcase and aligned with the first orifice for surrounding and guiding the axle shaft projecting through the orifice.

3. A drive arrangement as defined in claim 1, wherein a further wall portion of the oil sump has an indentation configured so as to at least partially receive a secondary assembly.

4. A drive arrangement as defined in claim 3, wherein the indentation in the further wall portion is configured to at least partially receive an alternator.

5. A drive arrangement as defined in claim 1, wherein the tunnel-like indentation connecting the orifice to the indent for the differential gear has a cylindrical shape.

6. A drive arrangement as defined in claim 1, wherein the oil sump has an essentially triangular shape in cross section.

7. A drive arrangement as defined in claim 1, wherein the center axis of the first orifice extends through a part of the crankcase designed as a bearing crossmember between the oil sump and the crankcase.

* * * * *